(12) United States Patent
Phillips

(10) Patent No.: US 6,351,534 B1
(45) Date of Patent: Feb. 26, 2002

(54) POWER SUPPLY FOR TELECOMMUNICATIONS DEVICE

(75) Inventor: Simon Christopher Phillips, deceased, late of Sandy (GB), by Alison Jane Davies, legal representative

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 08/981,336

(22) PCT Filed: Jul. 31, 1996

(86) PCT No.: PCT/GB96/01850

§ 371 Date: Dec. 26, 1997

§ 102(e) Date: Dec. 26, 1997

(87) PCT Pub. No.: WO97/06630

PCT Pub. Date: Feb. 20, 1997

(30) Foreign Application Priority Data

Aug. 4, 1995 (GB) .............................................. 9516049

(51) Int. Cl.[7] ............................................. H04M 19/00
(52) U.S. Cl. ........................................ 379/413; 379/324
(58) Field of Search ................................. 379/413, 399, 379/324, 322, 323, 377, 383, 384, 413.01

(56) References Cited

U.S. PATENT DOCUMENTS

| 4,539,437 | A | * | 9/1985 | Giacopelli et al. | .......... 379/413 |
| 5,017,799 | A | * | 5/1991 | Fishman | .................... 379/324 |
| 5,457,741 | A | * | 10/1995 | Sonobe | ........................ 379/324 |

* cited by examiner

Primary Examiner—Stella Woo
(74) Attorney, Agent, or Firm—Lee, Mann, Smith, McWilliams, Sweeney & Ohlson

(57) ABSTRACT

A power supply has a plurality of single line interface circuits (20, 22, 24 and 26) each connected by a respective line, to a respective telephone (4, 6, 8 and 10) or other telecommunications device. Each SLIC applies a sufficient voltage derived from a battery to the line to operate the respective telephone, and dissipate any excess power supplied by the battery. The apparatus includes common power regulation means (30), which incorporates a switch mode power supply unit (68), and which monitors the voltages being supplied by the SLICs at any one time and reduces the voltages applied to the SLICs to substantially the maximum voltage required by any one of the SLICs, thereby reducing the amount of power dissipated by the SLICs.

8 Claims, 3 Drawing Sheets

Rloop = Rline + Rphone

Vab = Iloop * Rloop

Vreg = Vab(max) + Vbias

Rloop = Rline + Rphone

Vab = Vfeed * Rloop / (Rloop + Rfeed)

Vreg = Vab(max) + Vbias

POWER SUPPLY FOR TELECOMMUNICATIONS DEVICE

FIELD OF THE INVENTION

This invention relates to power supply apparatus for supplying electrical power to a number of remotely situated telecommunications devices, such as telephones, and to an assembly comprising such apparatus connected to a plurality of telephones.

BACKGROUND OF THE INVENTION

A conventional telephone exchange can serve a large number of telephones connected to the exchange along corresponding lines which are of differing lengths as a result of differences in the distances of the telephones from the exchange. As well as relaying telecommunications signals, the exchange also feeds to each line sufficient power to operate the telephones. That power can vary from one telephone to another in view of the differing lengths of the lines, which give rise to differences in the amount of resistive losses on the various lines.

The variation in power requirements is accommodated by means of a number of subscriber line interface circuits (SLICS), each of which relays through a respective line a sufficient amount of power to operate its respective telephone. If linear SLICs are used, excess power supplied to each circuit from the source is dissipated as heat. In this case, the voltage applied to each SLIC from the power source has to be sufficient to operate the telephone connected by the longest line. If a large number of other telephones are connected on much shorter lines, a relatively large amount of power has to be dissipated by the SLICs associated with the shorter lines, which can be uneconomical and leads to cooling problems in the exchange.

Some exchanges use SLICs which have individual internal switch mode power supply units which reduce the power dissipation. However, such SLICs are relatively expensive.

SUMMARY OF THE INVENTION

According to the first aspect of the invention, there is provided power supply apparatus for connection to a plurality of remotely situated telecommunications devices along corresponding lines, the apparatus comprising a plurality of interface circuits, each having an input for connection to a common power source and an output for connection to a respective line, each interface circuit, when active, feeding sufficient power, derived from the source, to the line to provide the required amount of power to operate the respective telecommunications device, dissipating any excess power supplied to the interface circuit from the source, wherein the apparatus includes common power regulation means for monitoring a characteristic of the amount of power being fed by each active interface circuit to its respective line and so controlling the power supplied to each active interface circuit that said supplied power is substantially equal to the largest of the amounts of power required by the active interface circuits.

Thus the power regulation means ensures that the power supplied to all the interface circuits is governed by the requirements of the active interface circuit which has to feed the most power to its respective line. The invention therefore helps to reduce the amount of power which needs to be dissipated by the active interface circuits, particularly when the interface circuits with the highest power requirements are not active, and thus enables the apparatus to use relatively cheap linear SLICs, whilst avoiding, or at least ameliorating problems arising from the power dissipation in the SLICs.

Conveniently, the characteristic monitored by the regulating means is the respective voltage applied by each active interface circuit to its respective line, and the regulating means controls the power supplied to the interface circuits by controlling the voltage applied to the inputs of the interface circuits.

Conveniently, the apparatus is adapted to be connected to a source of dc power, for example, a battery.

The power regulation means preferably includes a switch mode power supply unit operable to reduce the voltage supplied by the dc source to the interface circuits.

Preferably, the interface circuits are mounted on a single card for mounting in a rack.

Preferably, the apparatus has a plurality of such cards, and the regulating means is one of a plurality of such means each associated with a respective card.

The use of a plurality of cards and associated regulating means enables -he allocation of lines to interface circuits to be such that the interface circuits on each card are connected to a number of lines of similar lengths, thereby reducing the range of powers to be fed by the interface circuits in each respective card. That reduction in range enables the amount of power dissipated by the interface circuits to be further reduced.

According to the second aspect of the invention, there is provided a telephone exchange having power supply apparatus in accordance with the first aspect of the invention connected to a plurality of remotely situated telephones along corresponding lines which are not necessarily of the same resistance, and to a dc power source.

Preferably, the apparatus has a plurality of cards, each having a respective set of interface circuits and all the lines connected to the circuits on each cards are of lengths which lie in a respective one of a plurality of different ranges.

The invention also lies in power regulation means for use in apparatus in accordance with the first aspect of the invention, the power regulation means comprising a power input for connection to a battery, a plurality of further inputs, each for connection to the output of a respective interface circuit, monitoring means connected to said further inputs for monitoring the voltage, or current fed, by each active interface unit to a respective line connecting that interface unit with a respective telecommunications device, the monitoring means being operable to determine, at any one time, the maximum of said voltages or currents; and control means for applying to all said interface circuits an output voltage, derived from said battery voltage, substantially equal to the largest of the voltages required by an active interface circuit.

Preferably, the monitoring means is arranged to monitor the voltages applied by said active interface circuits and to determine the largest of said voltages.

BRIEF DESCRIPTION OF THE DRAWINGS

Power supply apparatus in accordance with the invention will now be described, by way of example, with reference to the accompanying drawings in which.

DETAILED DESCRIPTION

Figure 1:
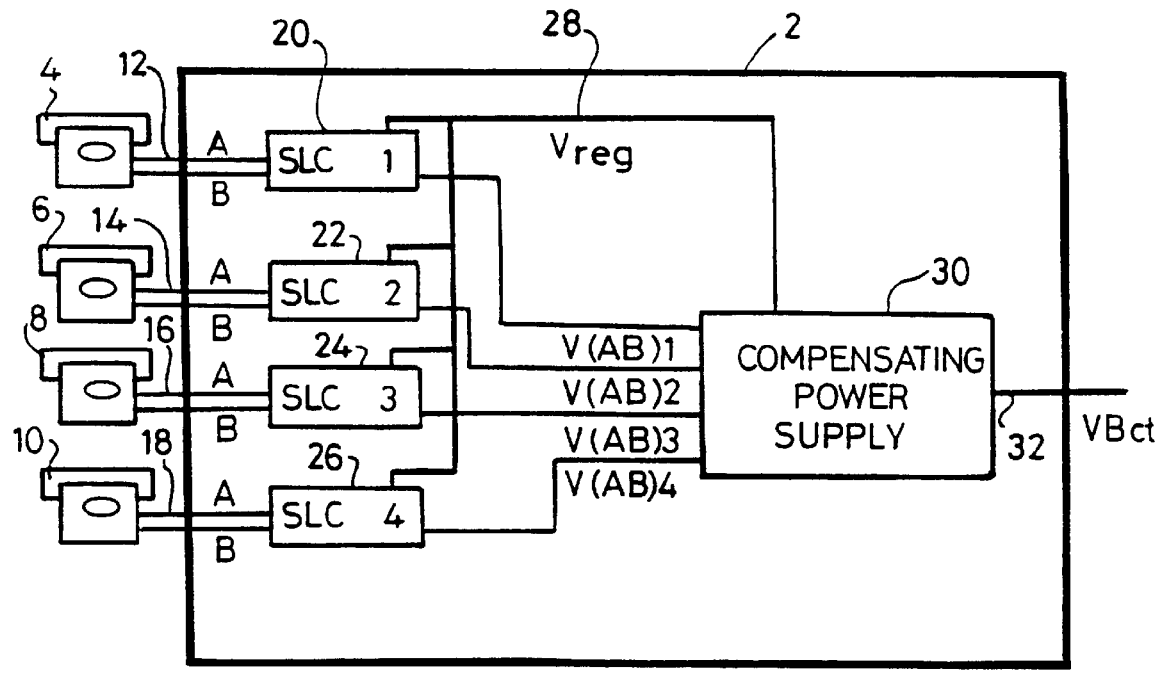
FIG. 1 is a schematic block diagram of the apparatus when connected to a number of telephones.

The power supply apparatus shown in FIG. 1 forms part of a telephone exchange 2 which is connected to a number of telephones, 4, 6, 8 and 10 along corresponding lines 12, 14, 16 and 18, each comprising a pair of conductors (A and B). For the sake of clarity, only 4 telephones are shown in the drawing, although typically the apparatus will serve between 6 and 15 telephones (or other telecommunications devices such as fax machines).

The apparatus in this example operates under a constant current protocol, which applies in the UK, by supplying a predetermined current to each telephone which is in use. However, apparatus in accordance with the invention can operate under different protocols, for example, the constant resistance requirements applicable in the USA.

The telephones are located at various different distances (in the range 0–5 km) from the exchange 2, and as a result, the connecting lines are not all of the same length. However, the lines have the same resistivity, and therefore do not house the same resistance.

Each of the lines 12, 14, 16 and 18 is connected to a respective one of four identical linear subscriber line interface circuits (SLICs) referenced 20, 22, 24 and 26. The subscriber line interface circuits all have inputs for the electrical power needed to operate the telephones 4, 6, 8 and 10, and those inputs are connected in parallel, as indicated by line 28 to regulating means 30 in the form of a compensating power supply.

Figure 2:
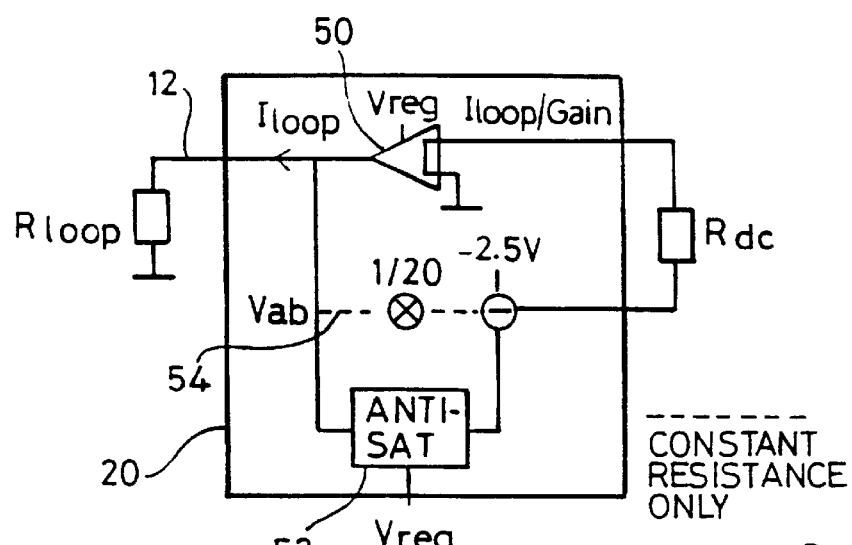
FIG. 2 is a block diagram of an interface circuit forming part of the apparatus shown in FIG. 1.

The single line interface circuit 20 is shown in greater detail in FIG. 2, in which the resistor Rloop represents the resistance of the line 12 and telephone 4. The circuit 20 comprises an amplifier 50 controlled by a feedback loop which includes an anti-saturation circuit 52 and an external programming resistor Rdc. The amplifier 50 applies a voltage, Vab, to the line 12 causing a current to flow therealong.

In the case of a constant current system, the current supplied by the amplifier is fixed unless the anti-saturation circuit 52 is activated. In the case of a constant resistance system, the voltage at the output of the amplifier 50 is fed back, as indicated by the dotted line 54, to simulate a constant resistance. Again, this may be modified by the anti-saturation circuit 52 (in the case of longer lines).

The anti-saturation circuit 52 provides a constant headroom voltage for the transmission of voice frequency (VF) signals, and will, if necessary, reduce the current (and hence Vab) to maintain voltage headroom for VF signals. The amplifier 50 is supplied with a voltage Vreg by the regulating means 30, and the difference between Vreg and Vab is dissipated in the amplifier 50.

Figure 3:
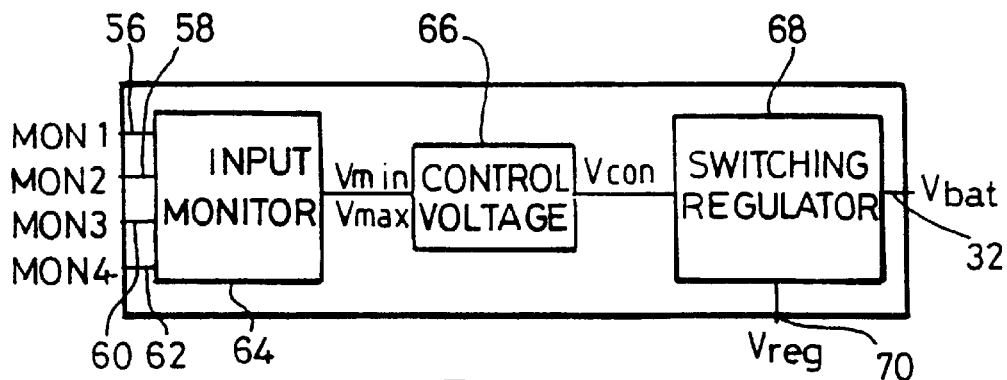
FIG. 3 is a block diagram of another part of the apparatus.

With reference to FIG. 3, the compensating power supply 30 has an input 32 for connection to a battery (not shown) or other source of dc power, and four monitor inputs 56, 58, 60 and 62, each of which is connected to the output of a respective one of the interface circuits 20, 22, 24 and 26. Each of the monitor inputs is in turn, connected to monitor circuitry 64 which monitors the voltages, V(AB) 1–4, being applied to each interface circuit to its respective line (when the telephone connected thereto is in use), determines the maximum of those voltages and feeds a signal representative of that maximum to a voltage control unit 66. The unit 66 is in turn connected to a power supply switching regulator 68 which is also connected to the power supply input 32, and to an output 70 (connected to the line 28). The regulator applies to the line 28 a voltage which is less than or equal to the battery voltage, and which is controlled by the unit 66 so as to be related to the maximum voltage in a way described below.

In this example, the constant current requirement is used to determine the voltage which has to be supplied by each SLIC to its respective line, when in use; the voltage applied has to be sufficient to produce 30 mA of current along the respective line. In view of the differences in resistances of the lines 12, 14, 16 and 18, that voltage will vary from one SLIC to another. Since each SLIC is a linear device, any excess power (i.e. power which is not then transmitted along the respective one of the lines 12, 14, 16 and 18) is dissipated as heat.

In use, switching regulator 68 of the compensating power supply 30 controls the voltage applied to the line 28 so that it is equivalent to that maximum voltage plus a bias voltage needed in order for the SLIC to operate. As a result, the power dissipated by the active SLIC which is applying the largest voltage to its respective line is minimised, and the power dissipated in the other active SLICs is less than would be the case if the full battery voltage were applied to all the SLICs.

It will be appreciated that the voltage supplied along the line 28 can vary depending upon which of the SLICs is in use at any one time.

Figure 7:
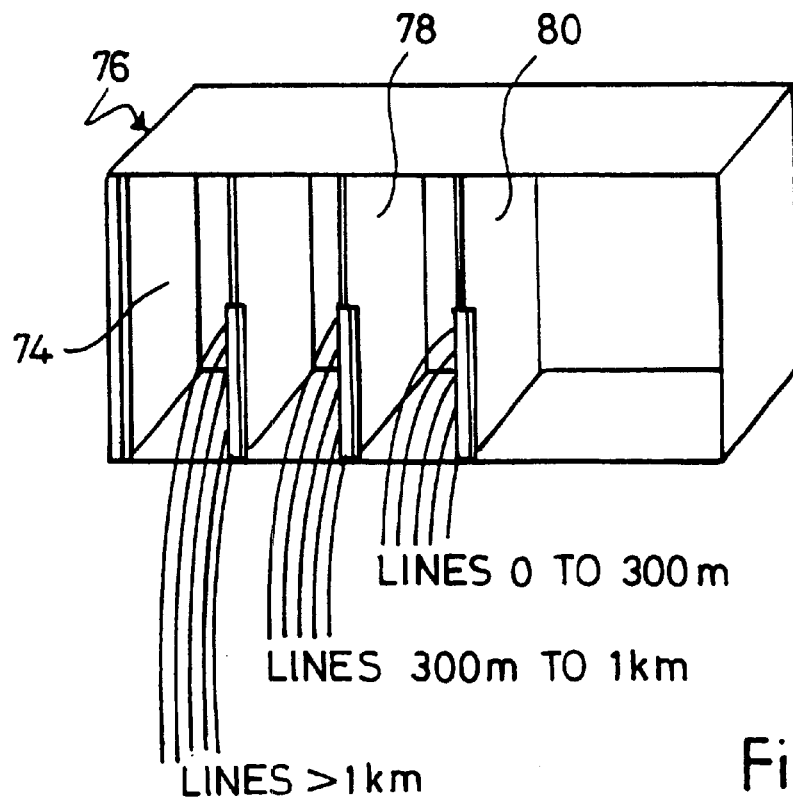
FIG. 7 shows an exchange having a subrack containing a plurality of power supply apparatuses in accordance with the invention.

As shown in FIG. 7, the components of the power supply apparatus can be mounted on a single card 74 accommodated in a rack 76 of a plurality of such cards, 74, 78, 80, each of which serves a respective set of telephones. The allocation of telephones to cards is such that the distance of each member in a set from the exchange lies in a respective range associated with that set, so that the range of different voltages which have to be applied by the SLICs on any one card can, as far as is practicable, be kept to a minimum. For example, all the telephones connected to the card 74 are situated more than 1 km from the rack 76, the telephones connected to the card 78 are situated in the range 300 m to 1 km and the telephones connected to the card 80 in the range 0 to 300 m.

A number of examples of the operation of the power supply apparatus on any one card, and of the resultant savings in dissipated power, are discussed below.

As explained above, all of the monitor inputs V(AB) 1–4 are examined and the output of the supply 30 is then adjusted to supply the voltage which will maintain the required subscriber line conditions on the worst active line (i.e. the line with the highest resistance). Some example cases are given below in which the battery voltage is 48 volts, V(ab) is the voltage applied to the line 28, (and is equal to the voltage detected at the respective one of the inputs 50, 58, 60, 62) and which assume a requirement of 30 mA constant current, telephone resistance of 400 ohms, subscriber line resistance of 200 ohms/km, and 5V bias required for line drivers.

Figure 4:
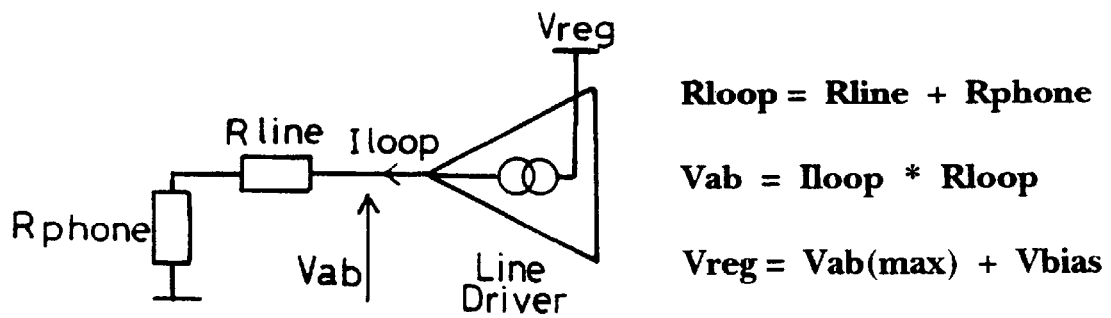
FIGS. 4 and 5 are diagrams illustrating the operation of the interface circuits.

With reference to FIG. 4, Rloop is the sum of the resistances of the telephone and the line, Rline and Rphone. Vab is the voltage which the SLIC has to apply to its line and Vreg is the voltage supplied to the SLIC by the supply 30.

Case (a)

All subscribers active on very short lines (negligible line resistance).

$$V_{ab}(max) = 0.03 \times R_{loop} = 0.03 \times 400 = 12V.$$

$$V_{reg} = (0.03 \times 400) + 5 = 17V.$$

In this case V(reg) will be set to 17V, and the dissipation in each SLIC will be 0.15W (total of 0.6W for all 4 channels)

Without compensating power supply, the power dissipated would be $0.03 \times (48-(0.03 \times 400) = 1.08W$ for each channel, would have to be dissipated Power saving is equivalent to 0.93W per channel.

Case (b)

3 subscribers active on very short lines (12, 14, 16-negligible line resistance), one subscriber active on 300M line (18).

$$V(ab)\{12, 14 \text{ and } 16\} = (0.03 \times 400) = 12V.$$

$$V(ab)\{18\} = (0.03 \times (400 + (0.3 \times 200)) = 13.8V.$$

$$V_{reg} = 13.8 + 5 = 18.8V.$$

In this case v(reg) will be set to 18.8V, and the dissipation in SLICs 20, 22, 24 will be 0.204W and in SLIC 26 will be 0.15W (total of 0.762W for all 4 channels).

Without compensating power supply, the power dissipated would be $0.03 \times (48-(0.03 \times 400)) = 1.08W$ for SLICS 20, 22 and 24 and $0.03 \times (48-(0.03 \times (400+(0.3 \times 200)))) = 1.026W$ for SLIC 26.

Power saving is equivalent to 0.876W per channel.

Case (c)

3 subscribers active on very short lines (12, 14, 16) (negligible line resistance), one subscriber active on 3 km line, (18)

$$V(ab)\{12, 14 \text{ and } 16\} = (0.03 \times 400) = 12V$$

$$V(ab)\{18\} = (0.03 \times (400 + (0.3 \times 200))) = 30V$$

$$V(reg) = 30 + 5 = 35V.$$

In this case V(reg) will be set to 35V, and the dissipation in SLIC 20, 22 and 24 will be 0.69W and in SLIC 26 0.15W (total of 2.22W for all 4 channels).

Without compensating power supply the power dissipated would be $0.03 \times (48-(0.03 \times 400)) = 1.08W$ for SLICs 20, 22 and 24 $0.03 \times (48-(0.03 \times (400+(0.3 \times 200)))) = 0.54W$ for SLIC 26.

Power saving is equivalent to 0.39W per channel.

Case (d)

1 subscriber active on very short line 12 (negligible line resistance), three subscribers active on 3km lines (14, 16, 18).

$$V(ab)\{12\} = (0.03 \times 400) = 12V.$$

$$V(ab)\{14, 16, 18\} = (0.03 \times (400 + (0.3 \times 200)) = 30V$$

$$V(reg) = 30 + 5 = 35V.$$

In this case V(reg) will be set to 35V, and the dissipation in SLIC 20 will be 0.69W and SLIC 22, 24, 26 is 0.15W (total of 1.14W for all 4 channels).

Without compensating power supply the power dissipated would be $0.03 \times (48-(0.03 \times 400)) = 1.08W$ for SLIC 20 and $0.03 \times (48-(0.03 \times (400+(0.3 \times 200)))) = 0.54W$ for SLICS {22, 24, 26}.

Power saving is equivalent to 0.39W per channel.

Figure 5:
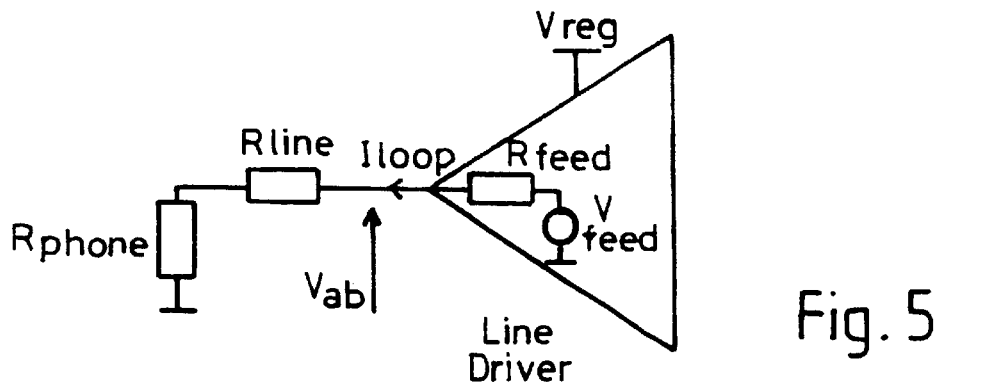

When the apparatus is used in a constant resistance system, the model illustrated in FIG. 5 applies. The following calculations assume a requirement of 2×200 ohm constant resistance feed (Rfeed) from 50V (Vfeed), a telephone resistance (Rphone) of 400 ohms, a line resistance (Rline) of 200 ohms/Km (multiplied by the line length), and a 5V bias requirement for the line drivers. Again, Vab is the voltage applied by a SLIC to its line and Vreg is the voltage applied to the SLICS by the supply 30. Iloop is the current flowing along the line.

Case (e)

All subscribers active on very short lines (negligible line resistance).

$$V_{ab} = 50 \times 400/(400+400) = 25V$$

$$I_{loop} = V_{ab}/R_{loop} = 25/400 = 62.5mA$$

$$V_{reg} = 25 + 5 = 30V$$

In this case Vreg will be set to 30V, and the dissipation in each SLIC will be 0.3125W (total of 1.25W for all 4 channels).

Without compensating power supply the power dissipated would be $0.0625 \times (48-25) = 1.44W$ for each channel.

Power saving is equivalent to 1.125W per channel.

Case (f)

3 subscribers active on very short lines (negligible line resistance), one subscriber active on 3 km line.

$$V_{ab}\{1\} = 50 \times (400+600)/(400+600+400) = 35.7V$$

$$I_{loop} = V_{ab}/R_{loop} = 35.7/(400+600) = 35.7mA$$

$$V_{ab}\{2, 3, 4\} = 50 \times 400/(400+400) = 25V$$

$$I_{loop} = V_{ab}/R_{loop} = 25/400 = 62.5mA$$

$$V_{reg} = 35.7 + 5 = 40.7V$$

In this case Vreg will be set to 40.7V, and the dissipation in each SLIC{1} will be 0.179W and in SLICs {2, 3, 4} will be 0.981W per channel (total power=3.122W).

Without compensating power supply the power dissipated would be $0.0357 \times (48-35.7) = 0.439W$ for channel 1 and channels 2, 3, 4 power=$0.0625 \times (48-25) = 1.44W$ per channel (total power=4.76W).

Power saving is equivalent to 0.41W per channel.

An alternative control loop method would employ the SLIC output signal (usually available on commercial components) which gives an indication of the loop current. In constant resistance feed applications the minimum loop current will directly show the longest line and hence highest Vab.

For constant current feed, where all lines are in the constant current region, the loop currents will be equal, in this case the control voltage would be reduced until one of the SLIC's anti-saturation circuits (the one with the longest line) began to reduce the loop current. Consequently the corresponding monitor input would begin to fall below the constant current value and at this point the regulated supply would maintain its voltage keeping the SLIC just on the edge of the constant current and anti-saturation regions of operation. The monitor block in this case outputs the minimum voltage (Vmin).

A control voltage (Vreg) is produced from the maximum/minimum loop monitor voltage to enable adjustment of the switching regulator to supply the voltage which will maintain the required subscriber line conditions on this worst case line. This block also ensures the regulated voltage is within SLIC battery input operating range.

Figure 6:
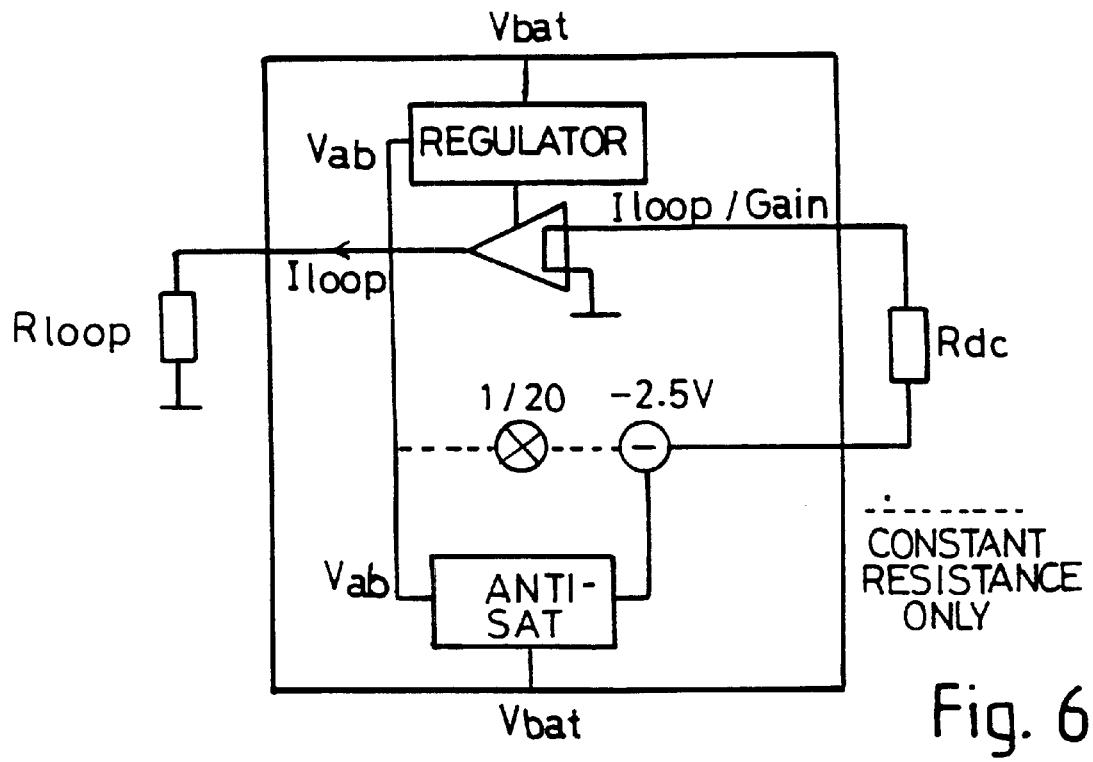
FIG. 6 shows an alternative type of interface circuit for use in apparatus not in accordance with the invention.

The SLIC shown in FIG. 6 is of a type having its own built-in regulator which operates, in a similar fashion to regulator 68, to reduce the voltage applied from a battery, without dissipating excess power. An exchange incorporating such SLICs, however, is relatively costly.

Although the invention has been described in relation to telephone exchanges, it can also be used in various types of primary multiplexing equipment, such as primary multiplexers supplying subscriber line access and situated remotely from the telephone exchange.

What is claimed is:

1. Power supply apparatus for connection to a plurality of remotely situated telecommunications devices along corresponding lines, the apparatus comprising a plurality of interface circuits, each having an input for connection to a common power source and an output for connection to a respective line, each interface circuit, when active, feeding sufficient power, derived from the source, to the line to provide the required amount of power to operate the respective telecommunications device, and dissipating any excess power supplied from the source, wherein the apparatus includes common power regulation means for monitoring a characteristic of the amount of Dower being fed by each active interface circuit to its respective line and so controlling the power supplied to each active interface circuit that said supplied power is substantially equal to the largest of the amounts of power required by the active interface circuits.

2. Apparatus according to claim 1 in which the regulating means is so arranged, in use, that it monitors the respective voltage applied by each active interface circuit to its respective line, controls the Dower supplied to the interface circuits by controlling the voltage applied to the inputs of the interface circuits.

3. Apparatus according to claim 1 in which the apparatus is adapted to be connected to a source of dc power.

4. Apparatus according to claim 1, in which the power regulation means includes a switch mode power supply unit operable to reduce the voltage supplied by the source to the interface circuits.

5. Apparatus according to claim 1, in which the interface circuits are mounted on a single card for mounting in a rack.

6. Apparatus according to claim 5, in which the card is one of a plurality of such cards, and the regulating means is one of a plurality of such means each associated with a respective one or more cards.

7. A telephone exchange having power supply apparatus in accordance with claim 1 connected to a plurality of remotely situated telephones along corresponding lines, and to a dc power source.

8. An exchange according to claim 7 in which the power supply apparatus has a plurality of cards, each having a respective set of interface circuits and all the lines connected to the circuits on each cards being of lengths which lie in a respective one of a plurality of different ranges.

* * * * *